Figure 1:
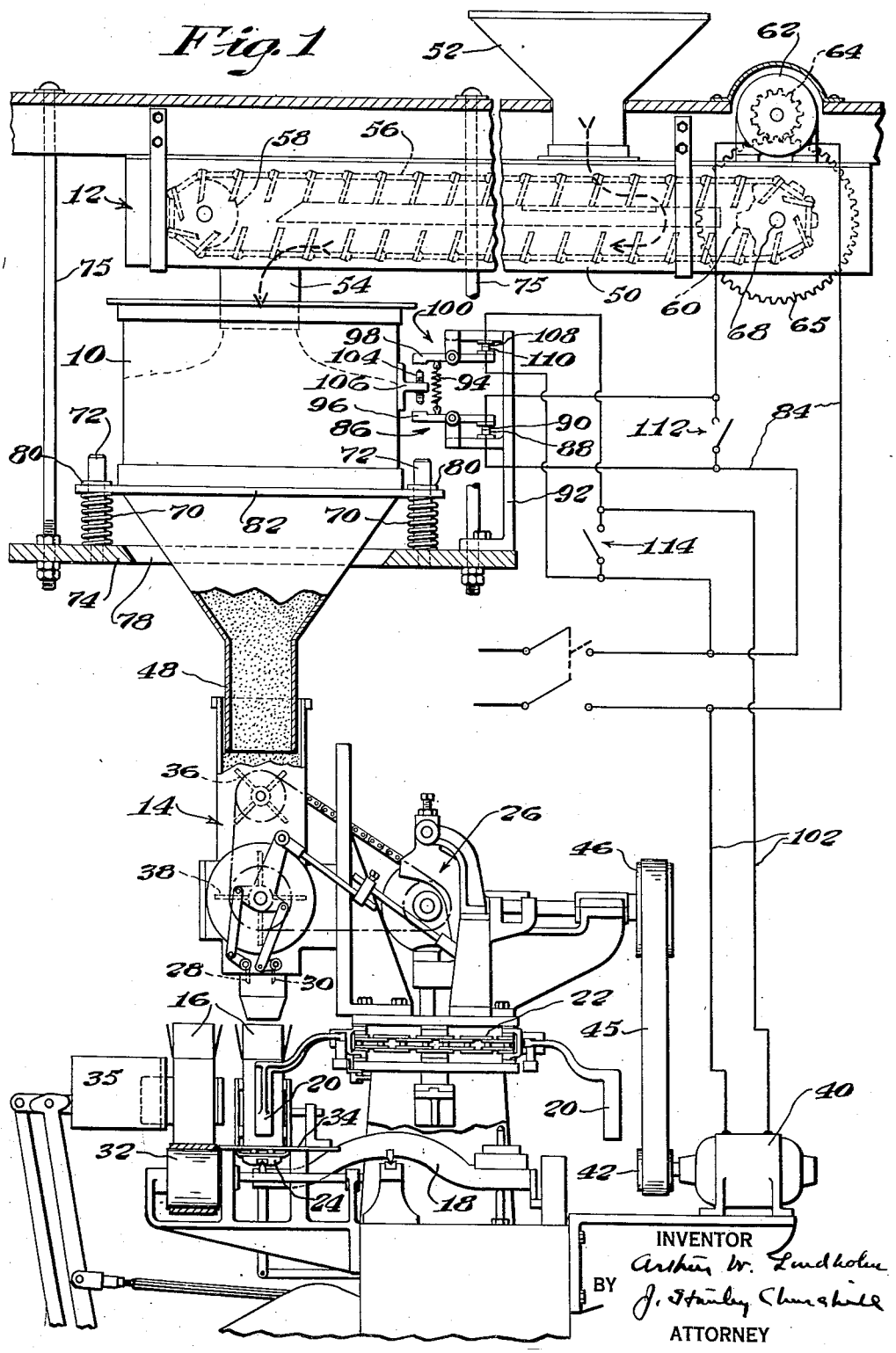

April 17, 1945.  A. W. LINDHOLM  2,373,838
AUTOMATIC WEIGHING MACHINE
Filed April 4, 1940  2 Sheets-Sheet 1

INVENTOR
Arthur W. Lindholm
BY J. Stanley Churchill
ATTORNEY

April 17, 1945.　　　A. W. LINDHOLM　　　2,373,838
AUTOMATIC WEIGHING MACHINE
Filed April 4, 1940　　　2 Sheets-Sheet 2
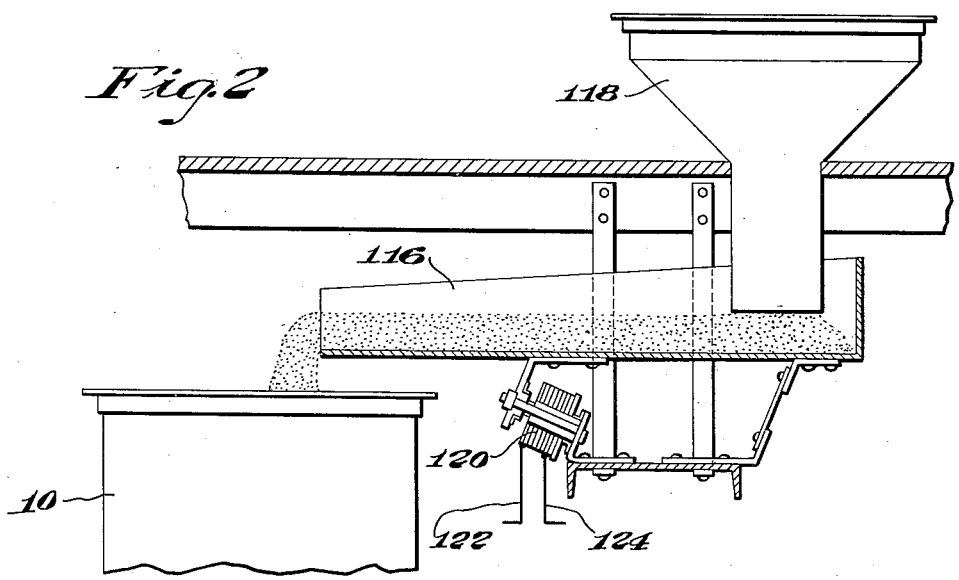
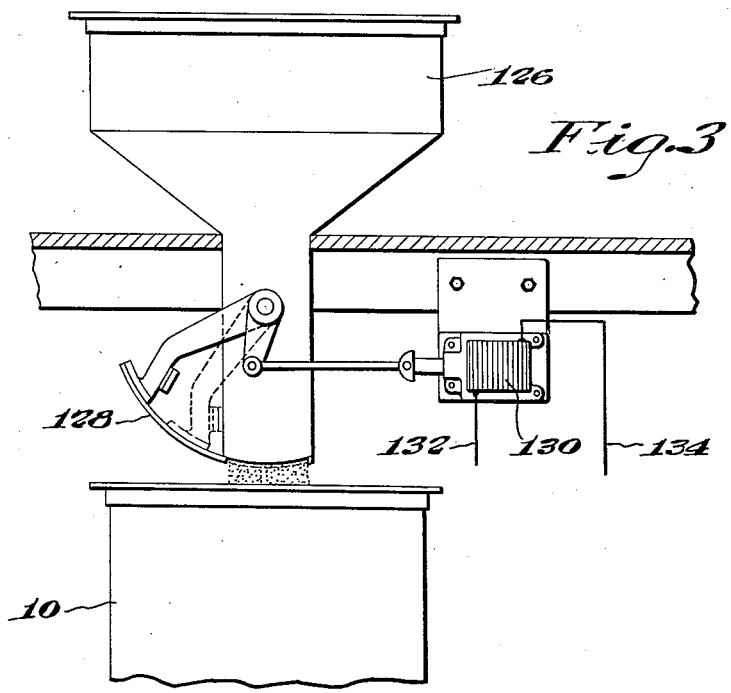
INVENTOR
Arthur W. Lindholm
BY J. Stanley Churchill
ATTORNEY Patented Apr. 17, 1945

2,373,838

UNITED STATES PATENT OFFICE 2,373,838

AUTOMATIC WEIGHING MACHINE

Arthur W. Lindholm, Milton, Mass., assignor to Pneumatic Scale Corporation, Limited, Quincy, Mass., a corporation of Massachusetts Application April 4, 1940, Serial No. 327,755

5 Claims. (Cl. 249—1)

This invention relates to a packaging machine and more particularly to a weighing machine.

The invention has for an object to provide a novel and improved weighing machine in which provision is made for controlling the supply of material to the machine whereby to effect the feeding of a substantially uniform stream of material onto the scale and whereby the impact force of such stream upon the scale may be maintained substantially constant to the end that inaccuracies in weighing formerly arising from variations in stream flow may be reduced to a minimum.

With this general object in view and such others as may hereinafter appear, the invention consists in the weighing machine and in the various structures, arrangements and combinations of parts hereinafter described and particularly defined in the claims at the end of this specification.

In the drawings illustrating the preferred embodiments of the invention, Fig. 1 is a side elevation of a weighing machine embodying one form of the present invention, some of the parts being shown in cross-section; and Figs. 2 and 3 are detail views of modified forms of material feeding apparatus to be referred to.

In general, the present invention is illustrated as embodied in a weighing machine of known form comprising essentially a scale including a scale beam and mechanism for feeding a stream of material onto the weighing end of the scale beam. The material to be weighed is caused to flow by gravity from a suitable storage hopper arranged to be supplied with material from any suitable source of supply and from which material is withdrawn, during the weighing operation, by suitable material feeding mechanism for causing a stream of material to flow onto the scale. The scale beam is counterweighted, and provision is made for cutting off the flow of material onto the weighing end of the scale beam when the scale beam is moved into a predetermined position by the material upon the weighing end thereof. In practice, a common form of mechanism for effecting the cutting off of the stream includes an electrical circuit which is adapted to be opened by the scale beam when such predetermined position is reached and suitable operating mechanism arranged to be rendered operative by the opening of such electrical circuit to instantaneously cut off the flow of material onto the scale beam.

One of the most frequent sources of inaccuracies or variations in final weights produced by the operation of a weighing machine resides in the variations in stream flow, and particularly where the material to be weighed is being withdrawn by gravity from a supply hopper any difference in the head of material in the hopper will be reflected in the stream flow. In the present commercial high speed weighing machines, the forces acting upon the scale beam during the weighing operation include, first the force due to the weight of the material already introduced into the carton, and second, the impact force of the falling material upon the scale beam. During the operation of the machine, if the material supply hopper is full, the material in the lower portion of the hopper will be more compact and hence, the density of the material will be greater than if the supply hopper were partially emptied. As a result of this difference in density, the momentum of the falling mass of material will be increased when the hopper is full and decreased when the hopper is partially empty causing a variation in the impact force of the falling material when it strikes the scale beam. In practice, where the scale beam is counterbalanced to effect tripping of the scale beam when a predetermined amount of material has been introduced into the carton plus the impact force of the final increment of the falling material, it will be seen that any variation in such impact force will cause inaccuracies in the final weights produced. For example, if the scale is counterbalanced for a relatively high impact force and the partial depletion of the material in the hopper causes a reduction in this force, a greater amount of material must be introduced into the carton before the scale beam will trip, thus resulting in an overweight package.

In accordance with the present invention, provision is made for maintaining a substantially constant level of material in the material supply hopper and the pressure of the head of the material will be substantially the same at all times during the weighing operations thus eliminating any inaccuracies in weight due to variations in momentum of the falling mass of material.

In one embodiment of the invention, as illustrated in the acccompanying drawings, when the weight of the material in the supply hopper exceeds a predetermined amount, the source of supply to the hopper is cut off and when the weight of the material in the hopper falls below a predetermined weight, the supply is again initiated to maintain a substantially constant supply in the hopper. On the other hand, should the weight of the material fall below a predetermined minimum, the machine will be stopped, and will not start again until the hopper has been supplied with the required amount of material.

Referring now to the drawings, one embodiment of the invention, as illustrated in Fig. 1, comprises a weighing machine having a material supply hopper 10 to which material is delivered by a conveyer 12 from any suitable source of supply, and from which the material is withdrawn by suitable material feeding mechanism, indicated generally at 14, to be introduced into a carton 16 resting upon one end of a scale beam 18. For purposes of illustration, the invention has been shown as embodied in a commercial weighing machine of the type illustrated and described in the United States patent to Howard, No. 1,893,622, January 10, 1933, to which reference may be had for a more complete disclosure of the operation of such weighing machine. In general, the illustrated weighing machine may include an intermittently operated package moving mechanism including package pusher arms 20 mounted upon an endless chain 22 adapted to move a carton into the scale pan 24 of the scale beam 18 during one period of operation and, control mechanism, indicated generally at 26, adapted to open and close the shutters 28, 30 of the material feeding mechanism 14 during another period of operation. In the automatic weighing machine the cartons are supplied to the machine upon an inlet conveyer 32 and successive cartons are transferred onto a platform 34 into the path of the pusher arms 20 by a transfer member 35. As fully described in the Howard patent above referred to, the machine is controlled to operate in successive cycles through connections actuated by the movement of the scale beam 18 whereby the shutters 28, 30 are closed and the package moving cycle of operation is initiated when the scale makes its weight. Thereafter when the package moving cycle has been completed, the shutters 28, 30 are again opened to permit the material to flow by gravity into a fresh carton delivered onto the scale. The material feeding mechanism 14 may be provided with the usual stirrers 36, 38 to facilitate the flow of the material therethrough. As herein shown, the machine may be driven by an electric motor 40 through its pulley 42 connected by a belt 45 to a drive pulley 46 on the machine. As will be hereinafter described, the electric motor 40 forms part of a circuit arranged to be opened to stop the machine when the weight of the material in the supply hopper falls below a predetermined minimum amount.

From the description thus far, it will be observed that the material is withdrawn from the supply hopper 10 by the feeding mechanism 14, the material falling by gravity through the bottom of the hopper as it is required by the feeding mechanism. In the embodiment of the invention, as illustrated in Fig. 1, the discharge end 48 of the hopper is loosely inserted into the top of the feeding mechanism, forming a telescopic connection, to permit the hopper to be raised or lowered with relation to the feeding mechanism in accordance with the weight of the material in the hopper as will be described.

As illustrated in Fig. 1, one form of mechanism for conveying the material from its source and delivering it to the supply hopper may comprise the conveyer 12 which may include a conduit 50 having an inlet 52 and an outlet 54 and through which an endless conveying element 56 is arranged to run. The conveying element runs over an idler 58 at one end of the conduit and a driven sprocket 60 at the other end, such a conveyer being of a commercial form known in the trade and operating in accordance with the principles disclosed in the United States Redler Reissue Patent No. 18,445, to which reference is made. As herein shown, the conveyer is driven by an electric motor 62 having a pinion 64 in mesh with a gear 66 fast on the sprocket shaft 68. The electric motor 62 forms part of a circuit arranged to be opened to stop the conveyer when the weight of the material in the hopper exceeds a predetermined maximum, as will be hereinafter described. For the purpose of the present invention, it is sufficient to state that the conveying element 56 when moved through the conveyer casing operates to convey the material in a continuous stream from the inlet 52 to be discharged through the outlet 54.

As herein illustrated, see Fig. 1, the material supply hopper 10 may be supported upon compression springs 70, coiled about studs 72 extending from a platform 74, the latter being supported by rods 75 depending from the floor above. The platform 74 is provided with an opening 78 through which the lower portion of the hopper extends. The studs 72 are slidingly fitted through bearings 80 provided in a flanged portion 82 of the hopper 10. Thus, the hopper is free to move vertically under the influence of the weight of the material in the hopper.

Provision is made for controlling the operation of the supply conveyer 12 and the operation of the weighing machine in accordance with the weight of the material in the supply hopper 10 as indicated by the vertical movement of the hopper. As herein shown, a circuit 84 to the conveyer motor 62 includes a switch 86 having a stationary contact 88 and a movable contact 90, the latter being pivotally mounted in the switch supporting bracket 92 attached to the stationary platform 74. The switch is normally held in its closed position as illustrated in Fig. 1, by a common spring 94 extended between the switch arm 96 and a similar switch arm 98 forming part of a similar switch 100 included in a circuit 102 leading to the machine motor 40. A switch arm engaging stud 104 vertically and adjustably mounted in a bracket 106 is secured to the side of the hopper 10, and normally, when the hopper is filled with the normal amount of material, the stud 104 is disposed between the two arms 96, 98 without engaging either. In operation, if the hopper 10 is filled above a predetermined height, the additional weight of the material will cause the hopper to descend. The stud 104 will then engage the arm 96 and open the circuit 84 at the contacts 88, 90 thereby stopping the conveyer motor 62 and consequently stopping the delivery of the material to the hopper. During the operation of the machine, continued withdrawals of material from the hopper will cause the hopper to rise under the influence of the springs 70 and the contacts 88, 90 will be reestablished to again feed material to the hopper.

In the event that the supply of material at its source is depleted, or, if for some other reason, the conveyer 12 fails to replenish the material withdrawn from the hopper, continued withdrawal of material will cause the hopper to become abnormally light, and when this occurs, the springs 70 will raise the hopper and the stud 104 will engage the arm 98 and open the circuit 102 at contacts 108, 110, thereby stopping the machine motor 40. When the required amount of material has been delivered to the hopper by the conveyer 12, the contacts 108, 110 will be reestablished to again start the weighing machine. Thus, a substantially constant level of material is maintained in the hopper 10 through the use of the limiting switches 86, 100 operated by vertical movement of the hopper effected by the relative weight of the material therein. The usual cut-out switches 112, 114 may be provided in the circuits 84, 102 respectively, in order to permit operation of the conveyer 12 or the weighing machine without going through the limiting switches, when such operation is necessary.

Referring now to Figs. 2 and 3, modified forms of the mechanism for delivering material to the supply hopper 10 are herein illustrated. In Fig. 2, a vibratory feeder 116 is employed. Material is delivered through a funnel 118 from a source of supply onto the vibratory feeder which is operated through a vibratory motor 120 to deliver the material into the hopper 10. The vibratory motor 120 is provided with leads 122, 124 which may be included in the circuit 84 in place of the motor 62 in order to start and stop the vibration of the vibratory motor 120 in accordance with the amount of material in the hopper 10, as above described, whereby the feed of the material into the hopper may be thus controlled.

Another modification of the mechanism for delivering material to the supply hopper 10, as illustrated in Fig. 3, may comprise a funnel 126 through which the material may flow by gravity from the source of supply into the hopper 10. As herein shown, the funnel 126 is provided with a gate or shutter 128 which may be operated by a solenoid 130 having leads 132, 134 which may be connected in the circuit 84, as above described, to control the feed of the material in accordance with the amount of material in the hopper. The solenoid 130 may and preferably will be of the well known and commercially available type provided with an internal spring (not shown) arranged to draw the armature inwardly when the circuit thereto is opened, thus closing the gate 128. When the solenoid is energized the armature is moved against the action of the spring to hold the gate open as illustrated.

From the above description, it will be observed that provision is made in the present weighing machine for assuring a substantially constant head of material in the supply hopper whereby the gravitational flow from the hopper is maintained substantially uniform thus effecting a substantially constant impact force upon the scale beam to the end that errors in weights which have heretofore accompanied variations in the flow of the material being weighed, may be reduced to a minimum.

While the preferred embodiments of the invention have been herein illustrated and described, it will be understood that the invention may be embodied in other forms within the scope of the following claims.

Having thus described the invention, what is claimed is:

1. A weighing machine having, in combination, a scale including a scale beam, means for feeding material by gravity upon the weighing end of the scale beam, a supply hopper located above and in direct communication with said feeding means and from which material is withdrawn, the rate at which material is fed by said feeding means being at least to some extent related to the head of material in the supply hopper, means for delivering material to said supply hopper, and control means for maintaining a substantially constant amount of material in said supply hopper whereby to effect a substantially uniform gravitational flow from said feeding means onto said scale beam, said control means including means for supporting said hopper adapted to permit the latter to move vertically under the influence of the weight of the material in the hopper, and means operatively connected to said hopper for terminating the delivery of material thereto when the weight of the material in the hopper exceeds a predetermined amount and for initiating such delivery when said weight falls below said amount, and means for terminating the operation of the weighing machine when said weight falls below a predetermined but substantially less amount.

2. A weighing machine having, in combination, a scale including a scale beam, means for feeding material by gravity upon the weighing end of the scale beam, a supply hopper located above and in direct communication with said feeding means and from which said material is withdrawn, the rate at which material is fed by said feeding means being at least to some extent related to the head of material in the supply hopper, means for delivering material to said supply hopper, and control means for maintaining a substantially constant amount of material in said supply hopper whereby to effect a substantially uniform gravitational flow of material from said feeding means onto said scale beam, said control means including means for supporting said hopper adapted to permit the latter to move vertically under the influence of the weight of the material in the hopper, a pair of limiting switches adapted to be operated by the vertical movement of said hopper for terminating the delivery of material thereto when the weight of the material therein exceeds a predetermined maximum and for terminating the operation of the weighing machine when said weight falls below a predetermined minimum.

3. An automatic weighing machine for weighing finely divided solid material having, in combination, a movably mounted supply hopper having a discharge outlet at the bottom, a scale including a scale beam disposed below said hopper and in a position to receive material directly discharged by gravity through said outlet whereby during operation a continuous vertical column of material of substantial length is being fed onto the scale beam and whereby variations in the amount of material in the hopper directly influence the rate of gravitational flow of material onto the scale beam, electrically operated means for positively delivering material to said supply hopper, and control means operatively connected to said electrically controlled material delivery means and actuated by movement of the hopper for maintaining a substantially constant amount of material in said supply hopper whereby to effect a substantially uniform gravitational flow of material from said supply hopper onto said scale beam, said control means including means for terminating the operation of the weighing machine when the hopper becomes depleted below a predetermined minimum amount of material and for thereafter initiating the operation of the machine when said delivery means has filled the hopper with a predetermined amount of material.

4. An automatic weighing machine for weighing finely divided solid material having, in combination, a movably mounted supply hopper having a discharge outlet at the bottom, a scale including a scale beam disposed below said hopper and in a position to receive material directly discharged by gravity through said outlet whereby during operation a continuous vertical column of material of substantial length is being fed onto the scale beam and whereby variations in the amount of material in the hopper directly influence the rate of gravitational flow of material onto the scale beam, electrically operated means for positively delivering material to said supply hopper, and control means operatively connected to said electrically controlled material delivery means and actuated by movement of the hopper for maintaining a substantially constant amount of material in said supply hopper whereby to effect a substantially uniform gravitational flow of material from said supply hopper onto said scale beam, said control means including means for terminating the delivery of material to the supply hopper when the latter is filled to a predetermined amount and for thereafter initiating the delivery of material to the supply hopper when continued withdrawals therefrom reduce the amount of material therein below said predetermined amount.

5. An automatic weighing machine for weighing finely divided solid material having, in combination, a movably mounted supply hopper having a discharge outlet at the bottom, a scale including a scale beam disposed below said hopper and in a position to receive material directly discharged by gravity through said outlet whereby during operation a continuous vertical column of material of substantial length is being fed onto the scale beam and whereby variations in the amount of material in the hopper directly influence the rate of gravitational flow of material onto the scale beam, electrically operated means for positively delivering material to said supply hopper, and control means operatively connected to said electrically controlled material delivery means and actuated by movement of the hopper for maintaining a substantially constant amount of material in said supply hopper whereby to effect a substantially uniform gravitational flow of material from said supply hopper onto said scale beam, said control means including means for terminating the delivery of material to the supply hopper when the latter is filled to a predetermined amount and for thereafter initiating the delivery of material to the supply hopper when continued withdrawals therefrom reduce the amount of material therein below said predetermined amount, and means for terminating the operation of the weighing machine when the material falls below a predetermined but substantially lesser amount.

ARTHUR W. LINDHOLM.